United States Patent [19]

Zwack et al.

[11] 4,136,025

[45] Jan. 23, 1979

[54] METHOD OF CLEANING MEMBRANE FILTER

[75] Inventors: Robert R. Zwack, New Kensington; Roger M. Christenson, Gibsonia, both of Pa.

[73] Assignee: PPG Industries, Inc., Pittsburgh, Pa.

[21] Appl. No.: 825,735

[22] Filed: Aug. 18, 1977

[51] Int. Cl.² ............................................. B01D 13/00
[52] U.S. Cl. ................................. 210/23 H; 210/23 F
[58] Field of Search ................. 210/22 C, 23 H, 23 F, 210/22 R, 23 R

[56] References Cited

U.S. PATENT DOCUMENTS 3,827,976  8/1974  Stana et al. ..................... 210/23 H

FOREIGN PATENT DOCUMENTS 1453575  10/1976  United Kingdom ................. 210/23 H Primary Examiner—John Adee
Attorney, Agent, or Firm—William J. Uhl

[57] ABSTRACT

A method of cleaning a membrane such as an ultrafilter which has been used in the treatment of a cataphoretic paint containing lead is disclosed. The method involves treating the membrane with an aqueous solution of an acid which forms a water-soluble lead salt and a water-soluble organic solvent.

7 Claims, No Drawings

METHOD OF CLEANING MEMBRANE FILTER

BACKGROUND OF THE INVENTION

1. Field of the Invention

This invention is in the field of membrane separations of electrophoretic paints and particularly relates to the cleaning of a membrane which has been fouled by a cataphoretic paint containing lead.

2. Brief Description of the Prior Art

Cationic electrodeposition of resinous materials onto metallic articles has become of great commercial significance in the appliance and automotive industries. Cationic electrodeposition provides coatings with outstanding corrosion resistance, usually much better than that provided by anionic electrodeposition. In anionic electrodeposition, the acidic resin is electrodeposited onto a metallic article serving as an anode and any residual acidity in the resin reduces its corrosion resistance. Further, metal ions from the anode are trapped within the film and they also adversely affect the corrosion resistance and color of the resultant coating. Cationic electrodeposition avoids these problems because the depositing resin is basic and there is no metal ion dissolution at the cathode.

A major problem in practicing electrodeposition on a continuous basis is in removing impurities and maintaining the electrodeposition bath properties. The solubilized electrodepositable resin is a polyelectrolyte and when the vehicle resin is coated upon the electrode, there remains in solution a counter ion which is used to solubilize the resin. In addition, as the electrodeposition proceeds, chemicals from various sources tend to accumulate in the electrodeposition bath. Contaminants such as phosphates and chromates are carried into the bath with the articles to be coated and the paint itself can also introduce contaminants.

Ultrafiltration has been found to be a particularly effective means of removing impurities and maintaining the properties of the electrodeposition bath. Ultrafiltration removes from the bath low molecular weight impurities such as counter ion, phosphates, chromates and low molecular weight resinous fragments while retaining the desirable high molecular weight resinous materials and pigments. Besides helping to maintain the properties of the electrodeposition bath, ultrafiltration is also a means of generating rinse water for removing dragout from the freshly electrocoated articles.

With anionic electrodeposition paints, ultrafiltration can be operated continuously for many months at a time without the membrane fouling or becoming clogged. However, it has been found that with cationic electrodeposition paints containing lead such as lead pigments, fouling or clogging of the membrane is a much more serious problem. Although the cause of the problem is not completely understood, it is believed that the acidic pH of the cataphoretic electrodeposition baths solubilize some of the lead pigment. Many of the chemicals used to pretreat the articles being coated, that is, phosphates and chromates which are carried into the bath with the articles, react with the solubilized lead and precipitate colloidal lead complexes which foul the membrane. Whatever the reason, experience has shown that typical commercially available ultrafiltration membranes which are used on a continuous basis for the treatment of anionic paints containing lead foul and become plugged much more quickly when used with cationic paints containing lead. Membrane fouling is a serious problem in that it not only detrimentally affects the properties of the electrodeposition bath, but also restricts the generation of needed rinse water.

SUMMARY OF THE INVENTION

In accordance with the present invention, it has been found that membranes which have been fouled in treating a cataphoretic paint containing lead such as by ultrafiltration, can be cleaned by treating the membrane with an aqueous solution of an acid which forms a water-soluble lead salt and a water-soluble organic solvent.

DETAILED DESCRIPTION

Typical cataphoretic paints which have been found to foul the membranes are those which have acidic pH's, i.e., less than 7, in which the resinous vehicle of the paint contains amine salt groups or quaternary ammonium salt groups. Resinous vehicles containing amine salt groups are described in U.S. Pat. Nos. 3,799,854; 3,984,299, both to Jerabek; and 3,947,338 to Jerabek, Marchetti and Zwack. Quaternary ammonium salt group-containing resins useful in electrodeposition paints are described in U.S. Pat. Nos. 3,962,165 and 3,937,679 to Bosso and Wismer.

Besides the resinous vehicle, the cataphoretic paints also contain lead. The lead is usually added in the form of pigments such as lead silicate, lead oxide, lead carbonate and lead chromate but may also be added in the form of soluble salts such as described in U.S. patent application Ser. No. 785,154, filed Apr. 6, 1977, to Zwack and Jerabek.

Cataphoretic paints also contain other pigments, co-solvents, surfactants and optional ingredients such as plasticizers and stabilizers such as are described in the aforementioned patents.

As mentioned above, the types of membranes which are fouled in the process of the invention are ultrafiltration membranes. The use of ultrafiltration for treating an electrodeposition bath is described in U.S. Pat. No. 3,663,405 to Christenson et al. Ultrafiltration involves forcing the paint under a pressure gradient against a suitable membrane. The membrane passes low molecular weight species such as water and organic co-solvents and low molecular weight impurities which accumulate in the bath such as metal pretreatment chemicals such as chromates and phosphates and other ions such as chloride and sulfate and low molecular weight resinous fragments while retaining higher molecular weight vehicle resins and pigments. Ultrafiltration operates at a pressure of about 10 to 150 psi and usually from about 25 to 75 psi.

The basic ultrafiltration process is relatively simple. The paint to be ultrafiltered is confined under pressure, utilizing, for example, either a compressed gas or liquid pump in the cell, in contact with an appropriate ultrafiltration membrane suitably supported. Ultrafiltration apparatus designed for treatment of electrodeposition paints are well known in the art and are described, for example, in U.S. Pat. Nos. 3,494,465 and 3,834,545.

Membranes for use in ultrafiltration are also well known and are supplied from a number of commercial manufacturers including Dorr-Oliver Company, Abcor, Inc., Romicon Company and Union Carbide Corporation. The membranes can be typically prepared from organic resinous materials such as cellulose acetate, polyvinyl chloride, polyacrylonitrile, polysulfones, polycarbonates, polyesters such as poly(methyl methacrylate) and poly(n-butyl acrylate), as well as copolymers formed from monomeric units of the above polymers, e.g., acrylonitrile-vinyl chloride copolymers. Membranes can also be prepared from inorganic materials.

It should be pointed out, however, that not all membrane materials may have sufficient solvent resistance to withstand the cleaning treatment of the present invention. Therefore, it is suggested that before the membrane is cleaned, a trial be undertaken to determine whether or not the membrane material can withstand the cleaning solution.

Besides ultrafiltration membranes, membranes which are used in other pressure filtration operations, such as reverse osmosis membranes, should also be cleanable in accordance with the present invention.

The treating solution which is used in cleaning the membranes is an aqueous solution of an acid which forms a water-soluble lead salt, and a water-soluble organic solvent.

Acids which form a soluble lead salt are organic acids such as formic acid, lactic acid, acetic acid, citric acid and mixtures thereof with lactic acid being preferred. By water-soluble lead salt is meant that the lead salt of the anion of the particular acid is soluble in water at a pH of 7 to the extent of at least 10 grams per liter of water measured at 25° C.

A water-soluble organic solvent is also included in the cleaning solution. Preferably the organic solvent is miscible with water, although organic solvents with less solubility can be tolerated. Examples of organic solvents include monoalkyl ethers of ethylene glycols in which the alkyl group contains from about 1 to 6 carbon atoms. Examples include monoethyl, monobutyl and monohexyl ethers of ethylene glycol. These products are commercially available from Union Carbide Corporation under the trademark CELLOSOLVE®. Also suitable would be the alkyl ethers of diethylene glycol such as butyl, ethyl and hexyl ethers of diethylene glycol. These materials are also commercially available from Union Carbide Corporation under the trademark CARBITOL®. Examples of other water-soluble organic solvents are alcohols such as isopropanol, ketones such as acetone, methyl ethyl ketone and 4-methoxy-4-methyl pentanone-2 and esters such as 2-ethoxyethyl acetate. Also, mixtures of water-soluble organic solvents can also be used.

The proportions of the various ingredients which are used in the cleaning solution vary over the ranges of from at least one percent and preferably from 1 to 10 percent by weight acid; from 2 to 60 preferably 5 to 50 percent by weight water-soluble organic solvent and the remainder, that is, from 39 to 97 preferably 49 to 94 percent by weight water; the percentages by weight being based on total weight of acid, water-soluble organic solvent and water.

Besides the key ingredients mentioned above, other ingredients such as surfactants, dispersing agents, acids and solvents other than those mentioned above can be included in the cleaning solution. Other optional ingredients such as defoaming agents, bactericides and corrosion inhibitors can also be included. These optional ingredients can be present in the cleaning solution in amounts of up to 10 percent by weight based on total weight of the cleaning solution.

In treating the membranes with the cleaning solution, the device, such as an ultrafilter, in which the membranes are housed, is isolated from the source of paint, drained of paint, and water circulated through the filtering device and across the membrane surface to remove residual paint. The water is then drained from the filtering device and the cleaning solution introduced and circulated across the membrane surface. In the case of an ultrafilter, the cleaning solution is pumped across the face of the fouled membrane under pressure, usually conventional ultrafiltration pressures which are used with cationic electrodeposition paints, that is, from about 10 to 150 psi. The temperature of the cleaning solution is not particularly critical and temperatures can range from room temperature, that is, about 20° C., to higher temperatures depending on the thermal resistance of the membrane, with temperatures on the order of 35° to 80° C. being preferred.

The cleaning solution is recirculated across the membrane surface for a period of time sufficient to clean and unclog the membrane. The period of time the cleaning solution is passed across the membrane depends on the nature and degree of fouling. In general, for commercial ultrafiltration devices, the cleaning solution should be circulated for at least about one hour, preferably for at least two hours. A combination of recirculating the cleaning solution across the membrane surface for at least one hour followed by soaking the membrane surface in the cleaning solution for at least two hours is usually a very effective cleaning procedure.

The effectiveness of the cleaning can be determined visually since the fouled membrane will be discolored. Also, the flux rate of water or paint permeating through the membrane before and after cleaning can be compared. The flux rates are greater after cleaning than before. Usually the flux rates after cleaning are close to that of a new membrane and in some cases may even be greater.

Illustrating the invention is the following example which is not to be construed as limiting the invention to its details. All parts and percentages in the example as well as throughout the specification are by weight unless otherwise specified.

EXAMPLE I

A cleaning solution was prepared by adding the following ingredients together in the order listed with mild stirring.

| Ingredient | Parts by Weight |
|---|---|
| butyl CELLOSOLVE[1] | 7.5 |
| lactic acid (88 percent by weight in water) | 5.7 |
| deionized water | 86.8 |

[1] Monobutyl ether of ethylene glycol.

The cleaning solution was used to clean a 5 foot long, 1 inch diameter, ultrafiltration tube which had been removed from a multi-tube housing where it had been fouled with a cationic electrodeposition paint such as the type generally described in U.S. Pat. No. 3,947,339. The paint contained a tertiary amine salt resinous vehicle and was pigmented with carbon black, lead silicate, strontium chromate and clay. Analysis of another representative fouled tube indicated highly inorganic fouling with high levels of lead, phosphorus and chromium. The tube yielded 5 gal./ft.$^2$/day deionized water flux at 80° F. (27° C.) and 20 psi. The tube yielded 2 gal./ft.$^2$/day permeate flux rate of standard laboratory electrodeposition paint at 20 percent solids, 35 gallons per minute recirculation rate, 50 psi and 82° F. (28° C.).

The cleaning solution was circulated through the ultrafilter at 25 gallons per minute, 20 psi, and 83° to 102° F. (28° to 39° C.) for six hours. Visual inspection of the cleaned tube indicated no remaining fouling. The cleaned tube yielded 124 gal./ft.$^2$/day deionized water flux at 80° F. (27° C.) and 20 psi, an improvement of 250 percent. The tube yielded 12 gal./ft.$^2$/day permeate flux rate of standard laboratory electrodeposition paint at 20 percent solids, 35 gallons per minute recirculation rate, 50 psi and 82° F. (28° C.), an improvement of 500 percent.

We claim:

1. A method of cleaning a membrane which has been used for filtering under pressure a cataphoretic paint containing lead and which has been fouled by said paint, said method comprising:

(A) treating said membrane with an aqueous solution of an acid which forms a water-soluble lead salt, and a water-soluble organic solvent.

2. The method of claim 1 in which the filtering is an ultrafiltration.

3. The method of claim 1 in which the acid is an organic acid.

4. The method of claim 3 in which the organic acid is selected from the class consisting of formic acid, lactic acid, acetic acid and citric acid.

5. The method of claim 1 in which the water-soluble solvent is a monoalkyl ether of ethylene glycol.

6. The method of claim 1 in which the cleaning solution is recirculated across the face of the fouled membrane under pressure.

7. A method of cleaning a membrane which has been used for ultrafiltering a cataphoretic paint containing lead and which has been fouled by said paint, said method comprising:

(A) circulating across the face of the membrane an aqueous solution of lactic acid and a monoalkyl ether of ethylene glycol.

* * * * *